United States Patent
Pak et al.

(10) Patent No.: US 9,183,195 B2
(45) Date of Patent: Nov. 10, 2015

(54) AUTOCORRECTING TEXT FOR THE PURPOSE OF MATCHING WORDS FROM AN APPROVED CORPUS

(71) Applicant: Disney Enterprises, Inc., Burbank, CA (US)

(72) Inventors: Paul Pak, North Hollywood, CA (US); Steven Ligatsa, North Hollywood, CA (US); Cory Bates, Seattle, WA (US); Sean O'Dell, West Hills, CA (US); Andrew Beechum, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 282 days.

(21) Appl. No.: 13/843,255

(22) Filed: Mar. 15, 2013

(65) Prior Publication Data

US 2014/0278361 A1    Sep. 18, 2014

(51) Int. Cl.
G06F 17/27    (2006.01)
G06F 17/22    (2006.01)

(52) U.S. Cl.
CPC .......... *G06F 17/273* (2013.01); *G06F 17/2276* (2013.01)

(58) Field of Classification Search
CPC ............................ G06F 17/227; G06F 17/273
USPC ..................................... 704/1, 9, 10
See application file for complete search history.

(56) References Cited

U.S. PATENT DOCUMENTS

| | | | |
|---|---|---|---|
| 7,810,033 B2* | 10/2010 | Cordes et al. ................ 715/700 |
| 2003/0182391 A1* | 9/2003 | Leber et al. .................. 709/217 |
| 2004/0030540 A1* | 2/2004 | Ovil et al. ........................ 704/1 |
| 2006/0142997 A1* | 6/2006 | Jakobsen et al. ............... 704/10 |
| 2009/0319915 A1* | 12/2009 | Bates et al. .................... 715/753 |
| 2010/0286979 A1* | 11/2010 | Zangvil et al. ................... 704/9 |
| 2011/0202512 A1* | 8/2011 | Pantanelli et al. ............ 707/706 |
| 2012/0005576 A1* | 1/2012 | Assadollahi .................. 715/261 |
| 2012/0259615 A1* | 10/2012 | Morin et al. ...................... 704/9 |
| 2013/0211824 A1* | 8/2013 | Tseng et al. ..................... 704/10 |
| 2013/0253910 A1* | 9/2013 | Turner et al. ..................... 704/9 |
| 2014/0040773 A1* | 2/2014 | Sanghavi et al. ............. 715/753 |
| 2014/0067731 A1* | 3/2014 | Adams ........................... 706/12 |
| 2014/0123050 A1* | 5/2014 | Danielsson et al. .......... 715/773 |
| 2014/0163953 A1* | 6/2014 | Parikh ............................... 704/9 |
| 2014/0229154 A1* | 8/2014 | Leydon et al. .................... 704/2 |
| 2015/0012867 A1* | 1/2015 | Yoon et al. .................... 715/773 |

* cited by examiner

*Primary Examiner* — Douglas Godbold
(74) *Attorney, Agent, or Firm* — Patterson + Sheridan, LLP

(57) ABSTRACT

System, method, and computer program product to autocorrect text for the purpose of matching words from an approved corpus, by: responsive to receiving a text input comprising a first word, validating the first word against a content corpus, wherein the content corpus comprises a plurality of words approved for display in an online chat, validating the first word against a set of rules, and upon determining that the first word of the text input is not validated against at least one of the content corpus and the set of rules, modifying the text input by replacing the first word with a first approved word from the content corpus.

25 Claims, 5 Drawing Sheets

AUTOCORRECTING TEXT FOR THE PURPOSE OF MATCHING WORDS FROM AN APPROVED CORPUS

BACKGROUND

1. Field of the Invention

Embodiments disclosed herein relate to computer software which autocorrects text entered in a chat application to match the text to approved words in an approved corpus.

2. Description of the Related Art

Currently, text-based communication applications correct words based on typos and grammatical errors. These solutions are ineffective when the applications are used by children or other sensitive groups, who may require some amount of censorship to ensure that inappropriate material is not transmitted through the application.

SUMMARY

Embodiments disclosed herein provide a system, method, and computer program product to autocorrect text for the purpose of matching words from an approved corpus, by: responsive to receiving a text input comprising a first word, validating the first word against a content corpus, wherein the content corpus comprises a plurality of words approved for display in an online chat, validating the first word against a set of rules, and upon determining that the first word of the text input is not validated against at least one of the content corpus and the set of rules, modifying the text input by replacing the first word with a first approved word from the content corpus.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
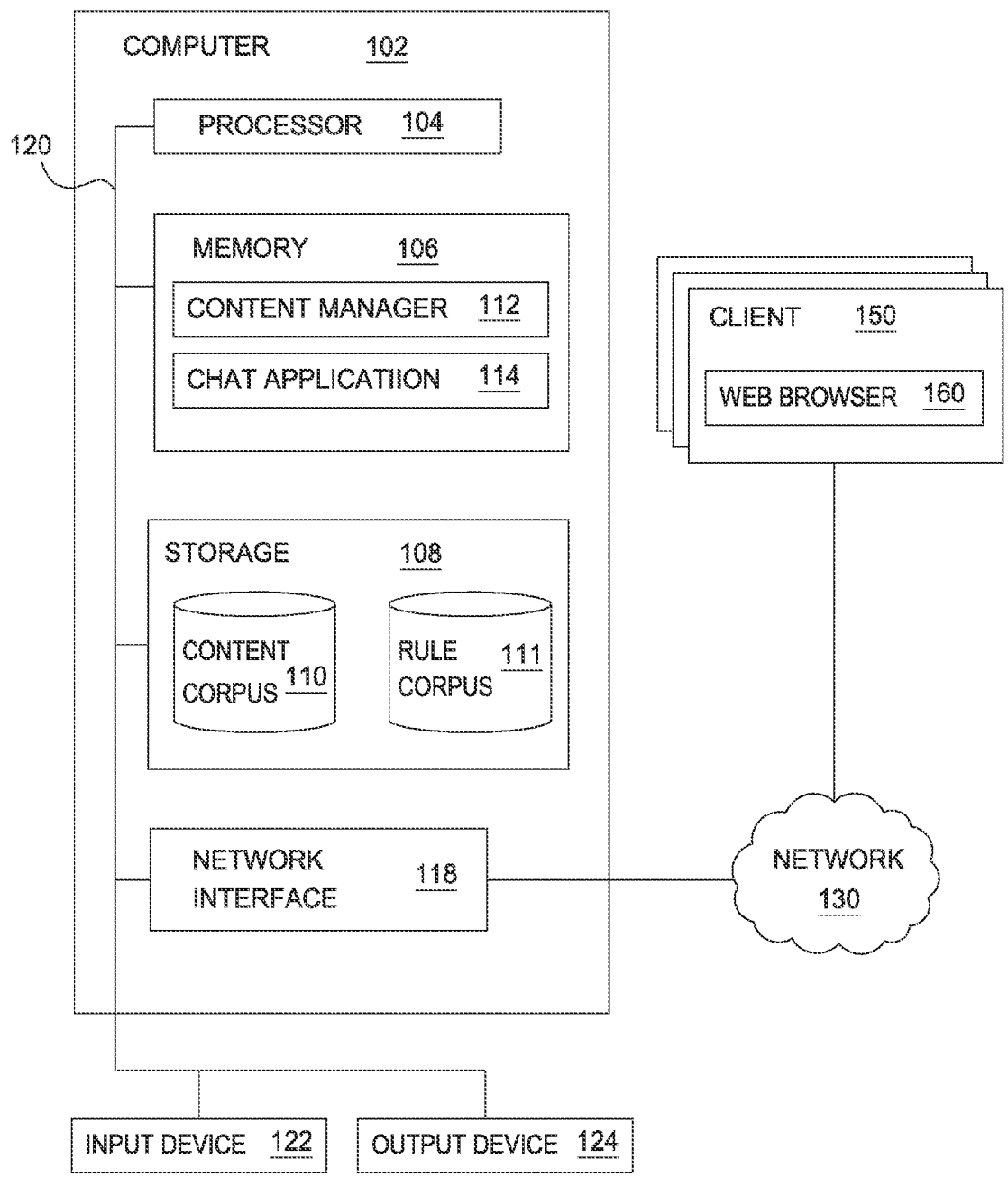
FIG. 1 is a block diagram illustrating a system for autocorrecting text for the purpose of matching words from an approved corpus, according to one embodiment disclosed herein.

Embodiments disclosed herein provide online chats which ensure that all communications consist of "safe" words that have been preapproved to be appropriate for display in the chat. To accomplish this, embodiments disclosed herein validate words entered as text input against a closed corpus of preapproved words, and validate the text input against a rules corpus such that inappropriate combinations of words and phrases are not used. If a word or phrase is invalidated, embodiments disclosed herein automatically replace the word or phrase with the closest matching valid word or phrase (the "corrections"). In one embodiment, the corrections are presented to the user for review, such that the user may make additional corrections prior to submitting the corrected text to the chat. In one embodiment, the users exchange message while participating in an online chat environment. Alternatively, users may be exchanging messages in an asynchronous manner (e.g., as SMS messages sent between mobile telephones).

In order to increase phrase coverage, if any word entered by the user causes the entire phrase to be invalid, the offending word may be corrected to the closest possible word match, which may result in a valid phrase. When a particular word is autocorrected, the corrected word may be highlighted, or given an alternative effect, to indicate to the user that their word has changed.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access online chat applications or related data available in the cloud. For example, the application to autocorrect text to match words from an approved corpus could execute on a computing system in the cloud and validate words and phrases entered by users in the chat application. In such a case, the autocorrect application could validate text and store chat logs at a storage location in the cloud. Doing so allows a user to access this information from any computing system attached to a network connected to the cloud (e.g., the Internet).

FIG. 1 is a block diagram illustrating a system 100 for autocorrecting text for the purpose of matching words from an approved corpus, according to one embodiment disclosed herein. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 108, an input device 122, and an output device 124. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 118 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, hard-disk drives, solid-state drives (SSD), flash memory devices, optical media (e.g., CD/DVD/Blu-Ray® discs) and the like. The memory 106 and the storage 108 may be part of one virtual address space spanning multiple primary and secondary storage devices.

As shown, the memory 106 contains the chat application 114, which is an application generally configured to provide a chat interface through which at least one user of client system 150 can type messages in real time to other users 150. In one embodiment, the plurality of clients 150 access the chat application 114 through the web browser 160. The memory 106 also contains the content manager 112, which is an application generally configured to restrict the content of messages submitted to the chat application 114. Generally, the content manager 112 ensures that all messages posted through the chat application 114 are "safe" by ensuring that the words making up the message are present in the pre-approved set of words and phrases in the content corpus 110, and that the words and phrases conform to each of the rules listed in the rule corpus 111. Validating that all words are "safe" may be particularly advantageous in chat rooms where children are the primary users. In one embodiment, the content manager 112 is a module of the chat application 114. In another embodiment, the chat application 114 fully incorporates the functionality of the content manager 112. In still another embodiment, the functionality of the content manager 112 and chat application 114 may be incorporated into another application, such as a game, web page, or other standalone application which may benefit from user communication.

As shown, storage 108 contains the content corpus 110, which stores a list of commonly used whole words and phrases, which have been approved as "safe" words and phrases by an administrator. The storage 108 also includes the rule corpus 111, which stores a list of commonly used words and rules that govern how these words can be combined. For example, the rules corpus 111 may indicate that although the word "sucker" is a safe word when used to describe a lollipop, using the phrase "you are a sucker" is not a safe phrase. Although depicted as databases, the content corpus 110 and the rule corpus 11 may take any form, including text files, xml data files, and the like. In one embodiment, a plurality of age-specific content corpuses 110 may be provided. In such an embodiment, an administrator (e.g., a parent), could select which corpus of words their child can view. In another embodiment, the content corpus 111 may contain a list of restricted words which cannot be entered by a user, and a separate approved content corpus may contain a list of words permitted for entry.

The input device 122 may be any device for providing input to the computer 102. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

Figure 2A:
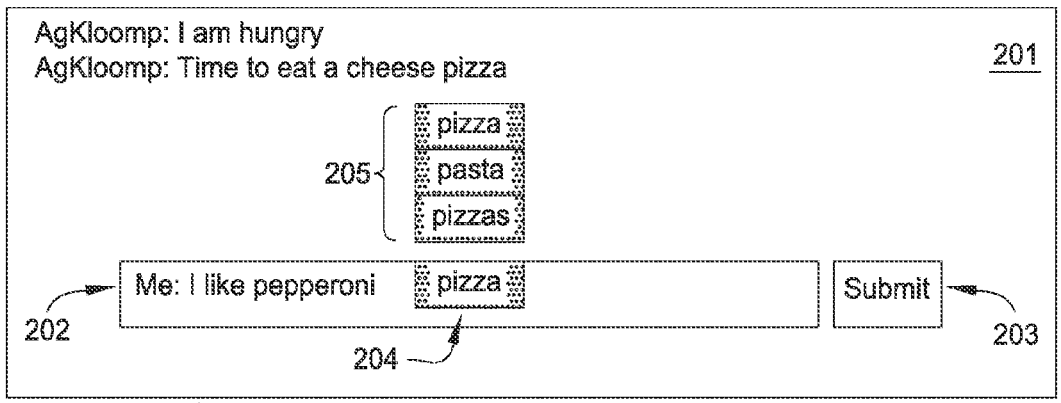
FIGS. 2A-C illustrate a user interface for autocorrecting text for the purpose of matching words from an approved corpus, according to one embodiment disclosed herein.

FIG. 2A illustrates a user interface 200 for autocorrecting text for the purpose of matching words from an approved corpus, according to one embodiment disclosed herein. In one embodiment, the user interface 200 may be generated by the system 100. As shown, the user interface 200 is for a chat room, and includes a display 201 which shows the text content of chats in the chat room. The user interface 200 also includes a text entry field 202, within which a user may enter a string of text, and submit the text to the chat room for posting on the display 201 where it may be seen by a plurality of other chat room members. The underlying chat application 114 generating the user interface 200 may be configured to only permit the submission of words and phrases that have been approved by an administrator. For example, children may be the primary users of the chat room. As such, the chat application 114 may include the content manager 112, which may be configured to restrict obscenities and other inappropriate language from the chat room. In order to do so, the content manager 112 monitors the text inputted by users in the text entry field 202, and validates the text to ensure that only approved words and phrases are submitted.

In the example depicted in FIG. 2A, a user has entered "I like pepperoni" in the text box 202. As the user enters text, the content manager 112 validates each word of the input 202 against the content corpus 110 and the rules corpus 111 to ensure that only "safe" text is displayed in the display 201. As each word is entered, the content manager 112 may make suggestions for the next word. As shown, the content manager 112 has suggested three different words 205 to complete the sentence, "pizza," "pizzas," and "pasta." Additionally, the content manager 112 has selected "pizza" as the next word 204 in the sentence being typed by the user. The content manager 112 may use the context of the previously entered words to make this determination. As shown, the content manager 112 may also provide an effect indicating that the words 204 and 205 are suggested words for addition to the sentence. The effect may be any effect suitable to distinguish that the word is a replacement, including, but not limited to, highlighting, bolding, underlining, a font color change, and the like. Furthermore, when the user clicks on the word "pizza" 204, the popup 205 may again be displayed, and any of the words may be selected by the user to complete the sentence. Although the nearly complete sentence "I like pepperoni" is shown in FIG. 2A, embodiments disclosed herein provide the same functionality for each word entered by the user. For example, after the user enters "I," the content manager 112 may suggest the words "like," "love," and "prefer."

Figure 2B:
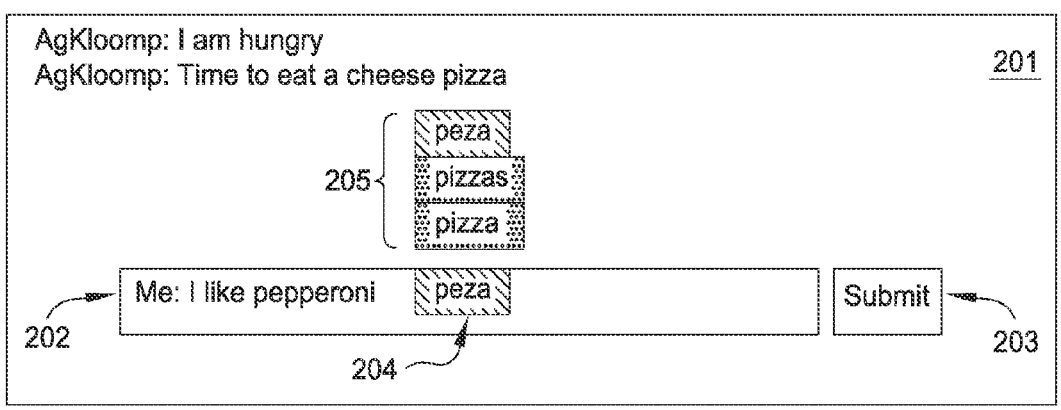

FIG. 2B illustrates the user interface 200 for autocorrecting text for the purpose of matching words from an approved corpus, according to one embodiment disclosed herein. As shown, the user has entered "I like pepperoni peza" in the text input box 202, which includes a misspelling of the word "pizza." Therefore, when the content manager 112 detects the user entry of "peza," it may reference the content corpus 110, determine that "peza" is not a valid word, but that it is closely related to the word "pizza," which it may use to replace the typo. The content manager 112 may use the context of the previously entered words to make this determination. Although not depicted, the content manager 112 may make the correction automatically, without any user input. Alternatively, the user may select the word 204, which displays the set of words 205, and the user may select the correct word.

When the content manager 112 substitutes "pizza" 204 in place of the originally entered "peza," it may provide an effect indicating that the word "pizza" 204 is a replacement. The effect may be any effect suitable to distinguish that the word is a replacement, including, but not limited to, highlighting, bolding, underlining, a font color change, and the like. Furthermore, when the user clicks on the replacement word "pizza" 204, a popup 205 may display the originally entered word, "peza," which may be selected by the user. If the user again selects "peza," the word may be highlighted to indicate that it is invalid. If invalid text is present in the text entry field

202, the content manager 112 may disable the submit button 203, such that the unsafe text may not be output to the display 201. If, however, the user does not alter the substitution of "pizza" for "peza," the submit button 203 remains active, and the user may submit the statement for output in the chat room display 201. Additionally, if the user does not approve a selection of one of the verified words for "peza," ("pizza" or "pizzas"), the content manager 112 may permit the user to submit the incomplete yet valid phrase "I like pepperoni." Although the misspelling of "peza" is used as an example, the use of correctly spelled, but improper words (i.e. those words not found in the content corpus 110), would trigger the same response described with reference to FIG. 2B. Misspellings and use of improper words by younger audiences may be a primary reason that otherwise safe words may be invalidated by the content manager 112. By correcting the misspellings and improper words with close matches, the content manager 112 may provide an enhanced experience for users.

Figure 2C:
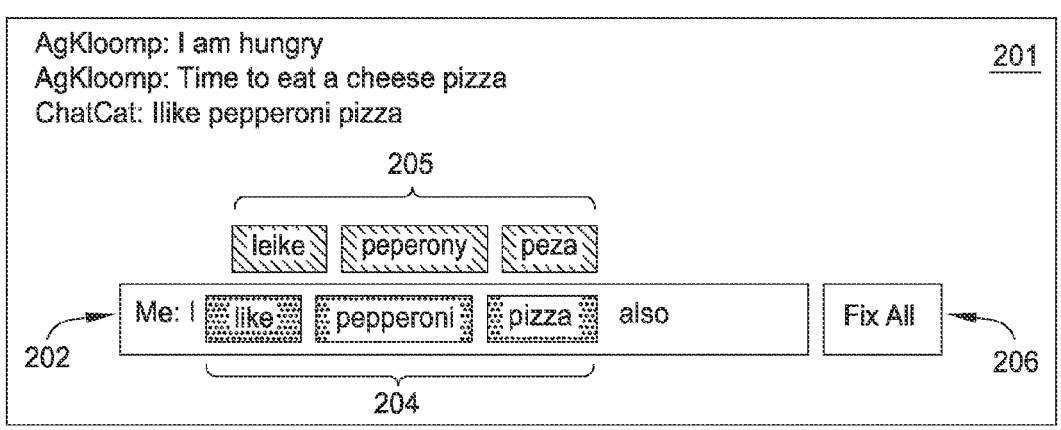

FIG. 2C illustrates the user interface 200 for autocorrecting text for the purpose of matching words from an approved corpus, according to one embodiment disclosed herein. As shown, the chat room display 201 has been updated to include the text entry made by the user, "I like pepperoni pizza." In FIG. 2C, a user has entered the phrase "I leike peperony peza also" in the text entry field 202, a phrase replete with typos. However, upon detecting the typos, the content manager 112 may disable the submit button and replace it with a "Fix All" button 206, which, when selected, automatically corrects each of the three typos by replacing the invalid words 205 with the valid words 204. When the user selects the Fix All button 206, text may automatically be submitted to the display 201, or the submit button may be reinstated, and the text may be submitted when the user selects the submit button.

Figure 3:
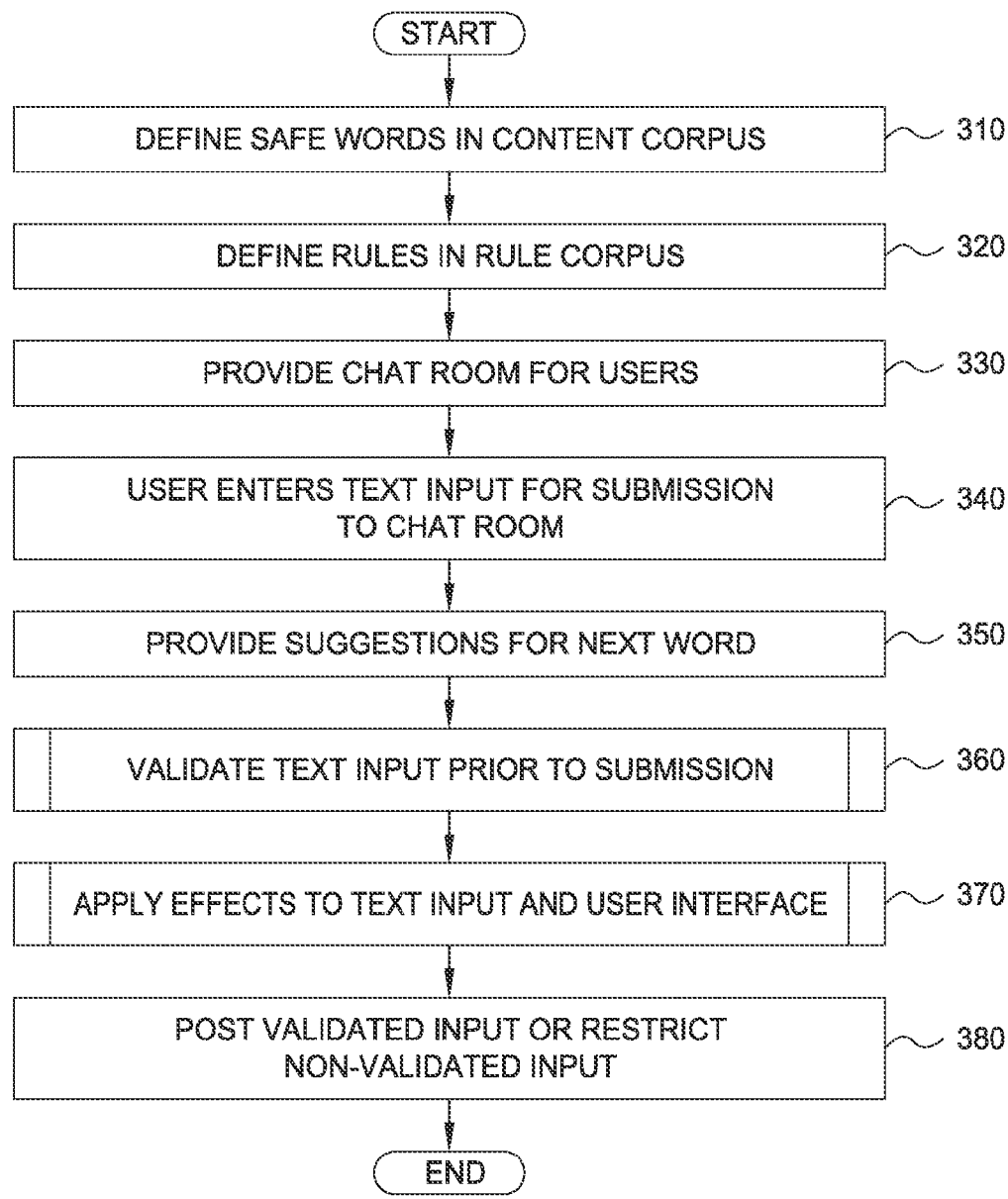
FIG. 3 is a flow chart illustrating a method for autocorrecting text for the purpose of matching words from an approved corpus, according to one embodiment disclosed herein.

FIG. 3 is a flow chart illustrating a method 300 for autocorrecting text for the purpose of matching words from an approved corpus, according to one embodiment disclosed herein. Generally, the method 300 ensures that any words or phrases entered by a user in a chat room are safe, valid words and phrases suitable for viewing by sensitive audiences. In one embodiment, the content manager 112, the chat application 114, or a combination of both may perform the steps of the method 300. At step 310, a set of safe words are defined in the content corpus 110. A user may manually enter the safe words, or a dictionary of safe words may be loaded into the content corpus 110. At step 320, a set of rules are defined in the rule corpus 111. A user may manually enter the rules, or the rules may be imported from a predefined rule set. The rules of the rule corpus 111 govern how words from the content corpus 110 may be combined. For example, while the word "blow" may an entry in the content corpus 110, an entry in the rule corpus 111 may indicate that the word "blow" may not be used with any noun, which may result in an offensive phrase. At step 330, a chat room is provided for users. In one embodiment, the chat application 114 may provide the chat room, and the content manager 112 may monitor the text entries made by users.

At step 350, the content manager 112 may provide suggestions for the next word to assist the user in completing the sentence. This step may comprise the content manager 112 referencing the content corpus 110 to identify possible valid words, and then referencing the rule corpus to ensure that any identified words do not violate any rules. The content manager 112 may use any suitable method to identify the next word, including predefined concepts, text analysis, and context. At step 360, described in greater detail with reference to FIG. 4, the content manager 112 validates the text input a user enters prior to submission to the chat room. Generally, at step 360, the content manager 112 ensures that each word, and combination of words, is safe (i.e., found in the content corpus 110), and does not violate any of the rules of the rule corpus 111. At step 370, described in greater detail with reference to FIG. 5, the content manager 112 applies effects to the text input and the user interface after validating the text. Generally, the content manager 112 may disable the submit button when invalid text is entered, such that it may not be submitted to the chat room. Additionally, the content manager 112 may provide effects to the words to indicate those words which are invalid, or valid replacements of invalid words. At step 380, the content manager 112 may allow a user to submit and post validated text, or may restrict non-validated input from being submitted to the chat room.

Figure 4:
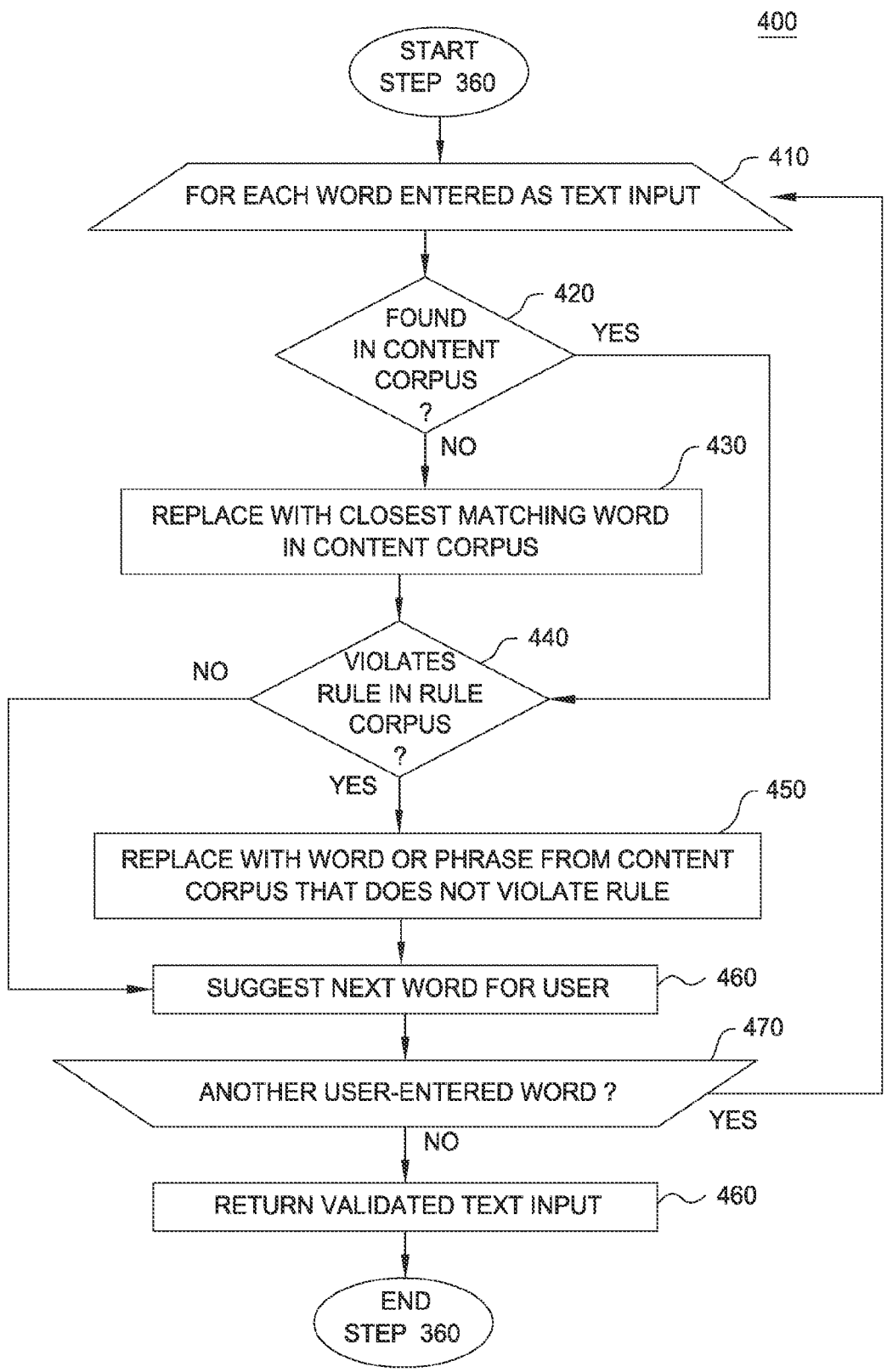
FIG. 4 is a flow chart illustrating a method to validate text input, according to one embodiment disclosed herein.

FIG. 4 is a flow chart illustrating a method 400 corresponding to step 360 to validate text input, according to one embodiment disclosed herein. Generally, the method 400 comprises validating each word entered by the user, as they are entered by the user, to ensure that only safe words are submitted to the chat room hosted by the chat application 114. In one embodiment, the content manager 112 performs the steps of the method 400. At step 410, the content manager 112 executes a loop containing steps 420-470 for each word entered by a user as text input. At step 420, the content manager 112 determines whether the word is found in the content corpus 110. If the word is found in the content corpus 110, the content manager 112 proceeds to step 440. Otherwise, the content manager 112 proceeds to step 430. At step 430, the content manager 112 replaces the current word with the closest matching word in the content corpus 110. For example, if the word is "Gints," the content manager 112 may identify the word "Giants" in the content corpus 110, and make the replacement. Any suitable method for detecting similar words may be used by the content manager 112.

At step 440, the content manager 112 determines whether the word, the replaced word, or a phrase including one of the word or the replaced word, violates any rules in the rule corpus 111. For example, if the replaced word creates an invalid phrase, a rule may be violated, and may be deemed unsafe for submission to the chat room. If a rule in the rule corpus 111 is violated, the content manager 112 proceeds to step 450. If a rule is not violated, the content manager 112 proceeds to step 460. In one embodiment, however, a word may match the content corpus 110, but may violate a rule in the rule corpus 111, resulting in an invalid phrase. For example, if the user types "I like petsa pie," "petsa" may be corrected to "pasta," a valid word from the content corpus 110. The phrase now reads "I like pasta pie," which may not be a valid phrase. However, in this embodiment, the user may still submit the phrase, which will be captured by the content manager 112 and not posted to the chat room. Therefore, in one embodiment, step 440 may not be required, as the content manager 112 may only determine whether each word is a valid word from the content corpus 110.

At step 450, the content manager 112 replaces the word or phrase with a word or phrase from the content corpus 110 which does not violate the rule. At step 460, the phrase entered by the user has been fully validated, so the content manager 112 may suggest another word for the user to help complete the sentence they are typing. The content manager 112 may analyze the prior content of the sentence, and provide words based on word frequencies, context, or any other suitable method. The suggested words are restricted to those words found in the content corpus 110, and any words or resulting phrases must be validated against the rules of the rule corpus 111. At step 470, the content manager 112 determines whether more words have been entered by the user. If more words have been entered, the content manager 112 returns to step 410 to validate the additional words. Otherwise, the content manager 112 proceeds to step 480, where it returns the validated text input. The validated text input may then be provided with effects according to the rules described below with reference to FIG. 5.

Figure 5:
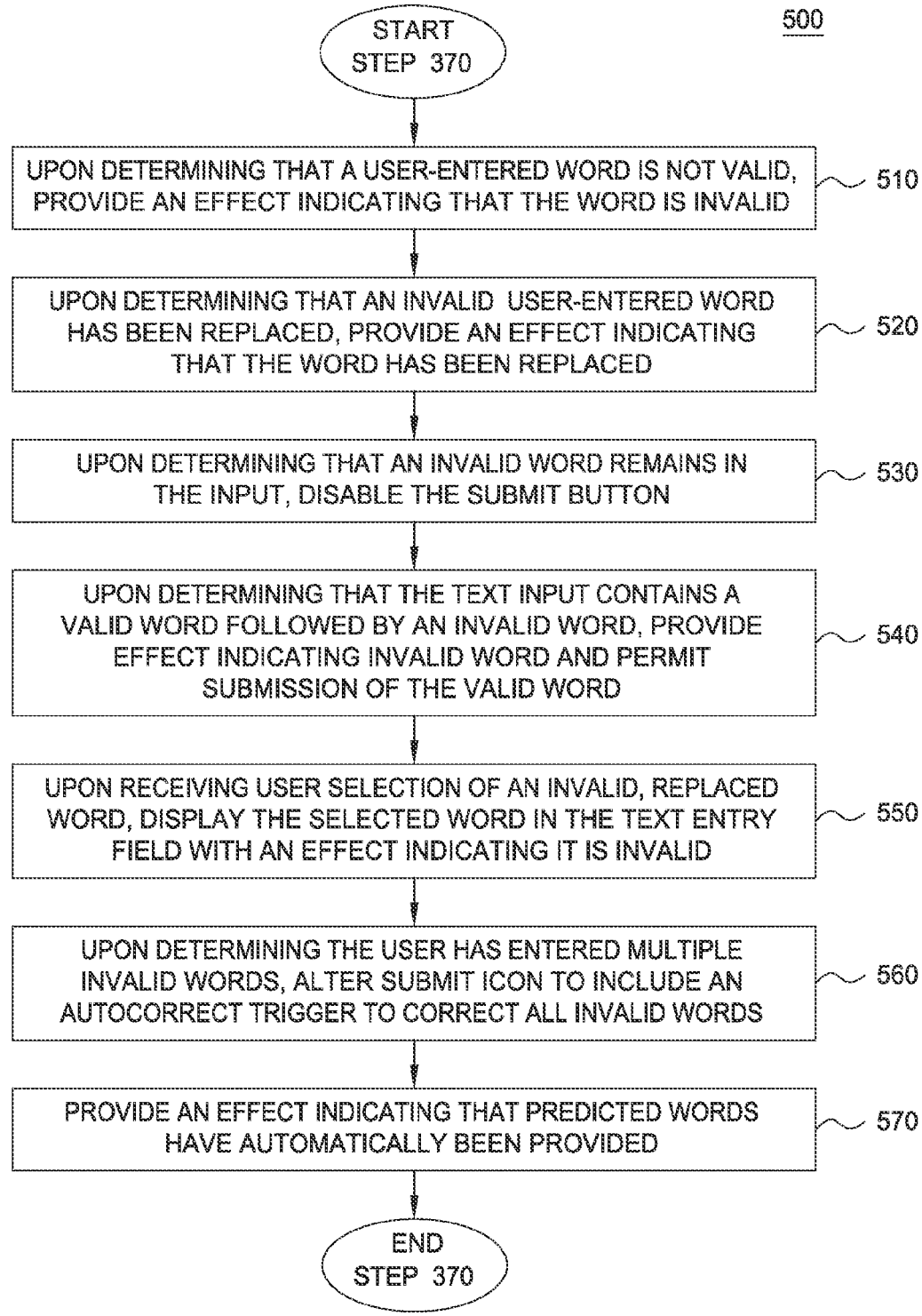
FIG. 5 is a flow chart illustrating a method to apply effects to text input and a user interface, according to one embodiment disclosed herein.

FIG. 5 is a flow chart illustrating a method 500 corresponding to step 370 to apply effects to text input and a user interface, according to one embodiment disclosed herein. Generally, the method 500 is directed at providing user interface effects to indicate invalid and replaced words entered by a user. In one embodiment, the content manager 112 may perform the steps of the method 500. Although depicted as a flow chart, one, several, or all of the steps of the method 500 may be performed when a user enters text for submission to a chat room of the chat application 114.

At step 510, the content manager 112, upon determining that a user-entered word is not valid, provides an effect indicating that the word is not valid. For example, the content manager 112 may change the font color of the invalid word, provide a colored background, encapsulate it in an object, or highlight, bold or underline the word. Generally, any suitable method may be used to apply the effects discussed herein. At step 520, the content manager 112, upon determining that an invalid user-entered word has been replaced with a valid word from the content corpus 110, provides an effect indicating that the word has replaced an invalid word. Again, any suitable effect may be provided to indicate that the word has been replaced. At step 530, the content manager 112 may disable the submit button upon determining that an invalid word or phrase remain in the text entry field. By disabling the submit button when invalid words or phrases remain in the text entry field, the content manager 112 may ensure that only safe words and phrases are submitted to the chat room. In another embodiment, instead of disabling the submit button, the user may be presented with one or more valid phrases that may be selected to replace the invalid phrase, which may then be submitted to the chat room.

At step 540, the content manager 112, upon determining that the text input contains a valid word or phrase which is followed by an invalid word or phrase, provides an effect indicating the invalid word, and permits the submission of the valid word or phrase. For example, if the text entry was "You are pretty ugly," the content manager 112 may gray out the word "ugly," and indicate that "You are pretty" may be submitted as valid text. At step 550, the content manager 112, upon receiving user selection of an invalid word that has been replaced, displays the invalid, replaced word in the text entry field with an effect indicating that it is invalid, and that the user may not submit the word. At step 560, the content manager 112, upon determining that the user has entered multiple invalid words, alters the submit button to include an autocorrect button which corrects all invalid words. Therefore, a user may quickly correct multiple errors. At step 570, the content manager 112 may provide an effect indicating that predicted words have been automatically provided for the user.

Advantageously, embodiments disclosed herein validate words against a corpus of acceptable words and phrases, and indicate what has been corrected, such that the user is aware of the corrections. Furthermore, embodiments disclosed herein allow the user to review the corrections before they are submitted to the chat room and seen by other users. If the user does not wish to use the autocorrected word, the originally entered word may be selected for reinstatement. The user may switch back and forth between valid replacements and the original input. Embodiments disclosed herein may also result in an increased amount of communication between chatters and gamers, and decreases the number of times the submit button may be disabled due to invalid input.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
responsive to receiving a text input comprising a first word:
   validating the first word against a content corpus, wherein the content corpus comprises a plurality of words approved for display in an online chat room, wherein a restricted word that is not in the content corpus is restricted from display in the online chat room;
   validating the first word against a set of rules; and
   upon determining, by operation of one or more computer processors, that the first word of the text input is not validated against at least one of the content corpus and the set of rules:
      modifying the text input by replacing the first word with a first approved word from the content corpus;
      receiving input specifying to submit the modified text input; and
      outputting the modified text input for display in the online chat room.

2. The method of claim 1, further comprising:
providing a visual effect on the first approved word indicating the replacement; and
upon determining that the first word is validated against the content corpus and the set of rules:
   proposing, by operation of one or more computer processors, at least a second word from the content corpus, based on the first word, as a next word of the text input.

3. The method of claim 1, further comprising:
responsive to receiving selection of the first approved word:
   displaying the first word, the first approved word, and a second word from the content corpus; and
   upon receiving selection of one of the first word, the first approved word, and the second word;
      replacing the first approved word with the selected one of the first word, the first approved word, and the second word; and providing a visual effect on the selected one of the first word, the first approved word, and the second word.

4. The method of claim 1, further comprising:
upon determining that the first word of the text input is not validated against at least one of the content corpus and the set of rules, disabling a submit button configured to display the text input in the online chat room, wherein disabling the submit button restricts display of the text input in the online chat room.

5. The method of claim 4, wherein disabling the submit button further comprises:
replacing the submit button with a selectable element configured to:
accept the first approved word as the replacement to the first word; and
submit the modified text input to the online chat room for display.

6. The method of claim 1, wherein the first word is not validated against the content corpus when the first word is not included in the content corpus, wherein the content corpus comprises a closed corpus of words approved for display in the online chat room, wherein the restricted word is part of a restricted corpus of words restricted from display in the online chat room.

7. The method of claim 1, wherein the set of rules comprises a plurality of rules related to an impermissible combination of words, wherein the first word is not validated against the set of rules when the first word violates a first rule, of the plurality of rules.

8. The method of claim 1, wherein the first word is a most recent word entered as part of the text input.

9. The method of claim 1, wherein the text input further comprises a second word, the method further comprising:
determining that the first approved word and the second word create a phrase that violates a first rule, of the set of rules; and
modifying the text input by replacing at least one of the first approved word and the second word with a second approved word from the content corpus.

10. A computer program product, the computer program product comprising:
a non-transitory computer-readable storage medium having computer-readable program code embodied therewith, the computer-readable program code executable by a processor to perform an operation comprising:
responsive to receiving a text input comprising a first word:
validating the first word against a content corpus, wherein the content corpus comprises a plurality of words approved for display in an online chat room, wherein a restricted word that is not in the content corpus is restricted from display in the online chat room;
validating the first word against a set of rules; and
upon determining that the first word of the text input is not validated against at least one of the content corpus and the set of rules:
modifying the text input by replacing the first word with a first approved word from the content corpus;
receiving input specifying to submit the modified text input; and
outputting the modified text input for display in the online chat room.

11. The computer program product of claim 10, the operation further comprising:

providing a visual effect on the first approved word indicating the replacement; and
upon determining that the first word is validated against the content corpus and the set of rules:
proposing at least a second word from the content corpus, based on the first word, as a next word of the text input.

12. The computer program product of claim 10, the operation further comprising:
computer-readable program code configured to, responsive to receiving selection of the first approved word:
display the first word, the first approved word, and a second word from the content corpus; and
upon receiving selection of one of the first word, the first approved word, and the second word;
replace the first approved word with the selected one of the first word, the first approved word, and the second word; and
provide a visual effect on the selected one of the first word, the first approved word, and the second word.

13. The computer program product of claim 10, further comprising:
computer-readable program code configured to, upon determining that the first word of the text input is not validated against at least one of the content corpus and the set of rules, disable a submit button configured to display the text input in the online chat room, wherein disabling the submit button restricts display of the text input in the online chat room.

14. The computer program product of claim 13, wherein disabling the submit button further comprises:
replacing the submit button with a selectable element configured to:
accept the first approved word as the replacement to the first word; and
submit the modified text input to the online chat room for display.

15. The computer program product of claim 10, wherein the first word is not validated against the content corpus when the first word is not included in the content corpus, wherein the content corpus comprises a closed corpus of words approved for display in the online chat room, wherein the restricted word is part of a restricted corpus of words restricted from display in the online chat room.

16. The computer program product of claim 10, wherein the set of rules comprises a plurality of rules related to an impermissible combination of words, wherein the first word is not validated against the set of rules when the first word violates a first rule, of the plurality of rules.

17. The computer program product of claim 10, wherein the first word is a most recent word entered as part of the text input.

18. A system, comprising:
one or more computer processors; and
a memory containing a program, which, when executed by the one or more computer processors, performs an operation comprising:
responsive to receiving a text input comprising a first word:
validating the first word against a content corpus, wherein the content corpus comprises a plurality of words approved for display in an online chat room, wherein a restricted word that is not in the content corpus is restricted from display in the online chat room;
validating the first word against a set of rules; and upon determining that the first word of the text input is not validated against at least one of the content corpus and the set of rules:
: modifying the text input by replacing the first word with a first approved word from the content corpus;
: receiving input specifying to submit the modified text input; and
: outputting the modified text input for display in the online chat room.

19. The system of claim 18, the operation further comprising:
: providing a visual effect on the first approved word indicating the replacement; and
: upon determining that the first word is validated against the content corpus and the set of rules:
:: proposing at least a second word from the content corpus, based on the first word, as a next word of the text input.

20. The system of claim 18, the operation further comprising:
: responsive to receiving selection of the first approved word:
:: displaying the first word, the first approved word, and a second word from the content corpus; and
:: upon receiving selection of one of the first word, the first approved word, and the second word;
::: replacing the first approved word with the selected one of the first word, the first approved word, and the second word; and
::: providing a visual effect on the selected one of the first word, the first approved word, and the second word.

21. The system of claim 18, the operation further comprising:
: upon determining that the first word of the text input is not validated against at least one of the content corpus and the set of rules, disabling a submit button configured to display the text input in the online chat room, wherein disabling the submit button restricts display of the text input in the online chat room.

22. The system of claim 21, wherein disabling the submit button further comprises:
: replacing the submit button with a selectable element configured to:
:: accept the first approved word as the replacement to the first word; and
:: submit the modified text input to the online chat room for display.

23. The system of claim 18, wherein the first word is not validated against the content corpus when the first word is not included in the content corpus, wherein the content corpus comprises a closed corpus of words approved for display in the online chat room, wherein the restricted word is part of a restricted corpus of words restricted from display in the online chat room.

24. The system of claim 18, wherein the set of rules comprises a plurality of rules related to an impermissible combination of words, wherein the first word is not validated against the set of rules when the first word violates a first rule, of the plurality of rules.

25. The system of claim 18, wherein the first word is a most recent word entered as part of the text input.

* * * * *